United States Patent Office 3,632,762
Patented Jan. 4, 1972

3,632,762
COMPOSITION AND METHOD FOR TREATING MALARIA
Patrick Mamalis, "Robins Ruff" 7 Wraylands Drive, Reigate, Surrey, England
No Drawing. Original application June 10, 1969, Ser. No. 831,996. Divided and this application Dec. 22, 1969, Ser. No. 889,861
Claims priority, application Great Britain, July 4, 1968, 31,970/68
Int. Cl. A61k 27/00
U.S. Cl. 424—249                      10 Claims

ABSTRACT OF THE DISCLOSURE

This inventon relates to pharmaceutical composition containing triazine compounds for the treatment of malaria.

---

The application is a division of Ser. No. 831,996 filed June 10, 1969.

This invention relates to pharmaceutical compounds and formulations for use against malaria.

Accordingly the present invention provides a pharmaceutical formulation for use in the treatment or prevention of malaria which comprises as active ingredient, a compound of formula

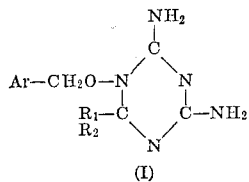

(I)

and acid addition salts thereof where Ar is phenyl substituted by at least one nitro group, and optionally substituted in addition by at least one halogen atom or at least one straight chain or branched lower alkyl group of 1–6 carbon atoms $R_1$ is lower alkyl of 1–4 carbon atoms and $R_2$ is hydrogen or lower alkyl of 1–4 carbon atoms together with a pharmaceutically acceptable carrier.

In certain preferred formulations of the present invention Ar is a mono- nitrophenyl, especially 3- or 4-nitrophenyl and $R_1$ and $R_2$ are both methyl.

Some of the compounds in the formulations of the present invention have been published, but no mention has been made of their activity against malaria.

The present invention also provides novel chemical compounds of Formula I provided that Ar is not 2- or 4-nitrophenyl.

Preferably the halogen is chlorine and the lower alkyl group is methyl.

The compounds of the present invention are intended for pharmaceutical use and acid addition salts, if used, should therefore be of relatively low toxicity. The compounds are conveniently made in the form of the monohydrahlic acid addition salts, for example the hydrobromide or the hydrochloride. Other salts may be employed in order to modify the properties of the product, such as its taste or physical properties e.g. solubility and absorption. For example, the compounds may be made in the form of the picrate, saccharinate, acetate, acid maleate, acid phthalate, succinate, phosphate, p-nitrobenzoate, stearate, mandelate, N-acetyl-glycinate, pamoate, cyclohexyl sulphamate, citrate, tartrate or gluconate.

Although formulae have been used herein in order to represent the compounds of the present invention, the value of the present invention does not depend upon the precise theoretical correctness of these formulae. The names and formulae used herein are not intended to limit the invention to any specific tautomeric form or to any specific optical or geometric isomer.

The active compounds of the present invention may be made by reacting a substituted diguanide of formula

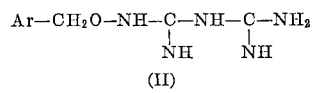

(II)

with a carbonyl compound of formula $R_1R_2 \cdot CO$ in the presence of an acid, preferably a strong acid for example hydrochloric or formic.

The reaction, may in some cases be carried out without any further solvents or diluents, but usually an inert solvent, such as a lower aliphatic alcohol (e.g. methanol) is preferred. Preferably at least one molecular equivalent of acid is used.

Alternatively, the compound may be prepared by reacting a compound of formula

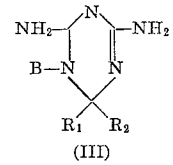

(III)

where B is OH or a reactive derivative thereof with a compound $ArCH_2OH$ or a reactive derivative thereof for example $ArCH_2Z$ where Z is chlorine, bromine or iodine in an inert solvent or diluent for example, dimethyl sulphoxide, dimethylformamide or ethanol.

The triazine derivative III is usually obtained in the form of an acid addition salt (e.g. the hydrochloride) from which the free base may be liberated by one equivalent of base such as an alkali metal hydroxide (e.g. potassium hydroxide) or sodium in ethanol or methanol. The mixture may then be evaporated and reacted in a suitable solvent (e.g. dimethylformamide or dimethylsulphoxide). Preferably extra base is not added, since with two equivalents of sodium in alcohol for example a less pure product is obtained.

In a modified procedure, usually giving poorer yields, the hydrochloride of compound III in dimethylformamido or dimethylsulphoxide is reacted with one equivalent of aqueous potassium hydroxide (using as little water as possible) and the resulting mixture reacted to give a triazine hydrohalide.

Activity of the compounds of the present invention for example 4,6-diamino-1,2-dihydro-2,2-dimethyl-1-(4-nitrobenzyloxy)-1,3,5-triazine against malarial parasites has been detected in laboratory screens by use of the rodent malarial parasite Plasmodium berghei in mice. Complete protection was observed after single subcutaneous doses of 80 mg./kg. of a suspension of this compound in oil given three days after infection. Using 40 mg./kg. there were 80% survivors after 60 days and using 20 mg./kg. there was a large increase in survival time. No acute toxicity was observed after oral doses of 640 mg./kg.

This compound was also found to protect chicks against the avian malarial parasite Plasmodium gallinaceum. Doses of 30, 60 and 120 mg./kg. gave survival after 30 days of 20%, 20% and 100% respectively.

This compound was also found to be active in vitro against the human malarial parasite Plasodium falciparum. Preliminary tests indicate the compound to be a potent antimalarial for human use.

Thus the active compounds of this invention may be employed for the treatment and prevention of malaria in man. Therefore, one aspect of the present invention is a method of treatment or prevention of malaria in man which comprises administering one of the active compounds to the person infected or at risk. The compound may be administered orally, parenterally, or by suppository, though the oral route is preferred.

The dose of the compound needed will, of course, depend on the particular salt form used, the route of presentation and whether the compound is being used as a prophylactic, or as a therapeutic dose to give clinical or radical cure of the disease. The oral dose, expressed in terms of the hydrochloride salt, will be in the range of 5 mg. to 5 g. of the compound daily (equivalent to approximately 0.07 to 70 mg./kg. for a 70 kg. human): a preferred dose range is 5 to 60 mg. daily.

As stated above the compound of this invention may be administered orally, parenterally or by suppository. The water solubility of the hydrochloride of the compound and most other salts is low and the hydrochloride is non-hydroscopic. If solutions are required it will be necessary to add solubilising agents to the water, choose non-aqueous solvents, find a more soluble salt or prepare very dilute solutions.

Oral formulations are preferred and with the above proviso in connection with solutions, typical oral formulations will include tablets, pills, capsules, sachets, granules, powders, chewing gum, suspensions, emulsions and solutions: particularly preferred oral formulations are tablets and capsules. Where appropriate and where necessary the formulation may include diluents, binding agents, dispersing agents, surface-active agents, lubricating agents, coating materials, flavouring agents, colouring agents, solvents, thickening agents, supending agents, sweeteners or any other pharmacetutically acceptable additives, for example gelatin, lactose, starch, talc, magnesium stearate, hydrogenated oils, polyglycols and syrups. Where the formulations are tablets or capsules and the like they will represent pre-measured unit doses but in the case of granules, powders, suspensions and the like the formulations may be presented as pre-measured unit d oses or in multidose containers from which the appropriate unit dose may be withdrawn.

The injectable form may be an aqueous or non-aqueous solution, suspension, or emulsion in a pharmaceutically acceptable liquid (e.g. sterile pyrogen free water or parenterally acceptable oils) or mixture of liquids which may contain bacteriostatic agents, antioxidants or other preservatives, buffers, (preferably in the physiological pH range of 6.5–7.0) solutes to render the solution isotonic with the blood, thickening agents, suspending agents, or other pharmaceutically acceptable additives. Such forms will be presented in unit dose form such as ampoules or disposable injection devices, or in multi-dose forms such as a bottle from which the appropriate dose may be withdrawn, or as a solid form or concentrate which can be used to quickly prepare an injectable formulation. All formulations for injections are preferably rendered sterile. Suppositories containing the compound will also contain suitable carriers (e.g. cocoa butter or polyglycols).

In addition to standard pharmaceutical additives, there may be included within formulations of the compound other therapeutic agents, particularly including other antimalarials (e.g. sulphonamides).

It is not intended that the invention should include mere solutions of known compounds in common solvents.

Insofar as the formulations of the present invention are novel this invention also provides a method of producing them.

Examples of the invention will now be described.

EXAMPLE 1

A mixture of 463 g. N-(4-nitrobenzyloxy)-diguanide, 1110 ml. methanol, 2220 ml. acetone, and 254 ml. concentrated hydrochloric acid was stirred for a short time and the clear solution was allowed to stand at room temperature (about 15° C.) for three days. The triazine hydrochloride which separated was collected and washed with methanol/acetone mixture (1:2). Drying at 70° C. gave 415 g. of reasonable pure 4,6-diamino-1,2-dihydro-2,2 - dimethyl - 1 - (4 - nitrobenzyloxy)-1,3,5-triazine hydrochloride, M.P. 227–228° (uncorrected). Concentration to 300 ml., adding 300 ml. acetone and allowing to stand gave a second crop of solid (21 g.), M.P. 220–222° (uncorrected). Tablets of 4,6-diamino-1,2-dihydro-2,2-dimethyl-1-(4-nitrobenzyloxy) - 1,3,5 - triazine hydrochloride. T tablet contains 10 mg. of active ingredient.

Dose: 2 tablets to be taken 3 times daily for three days (i.e. 60 mg. per day). Then 1 tablet to be taken twice daily (i.e. 20 mg. per day).

N.B. The tablet is compressed with embossed punches to produce a breakline, thus allowing half doses when required (5 mg.).

Formulation for production of 100,000 tablets (approximately 15 kg.)

|  | Grams |
|---|---|
| Active ingredient | 1,000 |
| Maize starch (6–9% moisture limit) | 1,500 |
| Gum. Acacia powder | 500 |
| Lactose | 8,000 |
| Icing sugar | 4,500 |
| Talc | 200 |
| Magnesium stearate | 100 |
| Liquid paraffin | 15 |

Water, approx. 1 litre.

N.B. Theoretical yield: 100,000 tablets.

METHOD (1) Granulation (1) Dry starch in a hot air oven at 40° C. until moisture is reduced to limit of 6–9% w./w.
(2) Sieve each of the powders separately through a 40 mesh sieve.
(3) Place the active ingredient in a planetary mixer and gradually add the lactose with continual stirring.
(4) Add the icing sugar, starch and acacia, mixing for about five minutes after each addition, continue to mix for a further twenty minutes.
(5) With constant mixing, add sufficient water until a suitable granule consistency is obtained (approximately 1 litre).
(6) Pass damp granules through a rotary granulator fitted with a 10 mesh screen.
(7) Dry the granules on trays at approximately 50° C.

(2) Compression mixture (1) Pass the dried granules through a 16 mesh screen.
(2) Sieve sufficient dried granules on a 40 mesh sieve to obtain approximately 500 grams of fines.
(3) Mix the liquid paraffin with the fines and pass through a 20 mesh sieve.
(4) Pass the talc and magnesium stearate through a 20 mesh sieve.
(5) To the bulk of the granules in a planetary mixer add the lubricated fines, followed by the talc and magnesium stearate. Mix thoroughly for at least ten minutes after each addition, and finally for twenty minutes.

(3) Tabletting

Compress the tablets on a rotary machine using specified punches and limits of thickness.

Check weight of tablets—10 tablets weigh 1.5 gms.

N.B. Coating

Tablets can be spray coated with specified film coating lacquer.

EXAMPLE 2

4,6-diamino - 1,2 - dihydro - 2,2 - dimethyl-1-(2-nitrobenzyloxy)-1,3,5-triazine hydrochloride M.P. 203–204° C. was made and incorporated into a pharmaceutical formulation by processes similar to those described in Example 1.

EXAMPLE 3

3-nitrobenzyl bromide was prepared as follows: 3-nitrobenzaldehyde was reduced to the corresponding alcohol with KBH₄, and the alcohol was then treated with aqueous HBr (48%) at 100° for two hours. The bromide was obtained as a crystalline solid M.P. 51–52°.

4,6-diamino - 1,2 - dihydro - 2,2 - dimethyl-1-hydroxy-1,3,5-triazine hydrochloride (7.75 g.) was dissolved in methanol (25 ml.) and a solution of potassium hydroxide (2.81 g.) in methanol was added. The mixture was refluxed for 15 minutes and then evaporated to dryness. The residue was suspended in formdimethylamide (50 ml.) with stirring, and a solution of m-nitrobenzyl bromide (10.7 g.) in formdimethylamide (15 ml.) was added at room temperature. After stirring for three hours, the solvent was removed under reduced pressure, and the residual solid was triturated with acetone, to give a white solid. The solid was thoroughly washed with water and dried to yield 4,6-diamino-1,2-dihydro - 2,2 - dimethyl-1-(3-nitrobenzyloxy)-1,3,5-triazine hydrochloride (13.8 g.) M.P. 226–227°. A sample was recrystallized from alcohol to provide an analytically pure material M.P. 228° C.

EXAMPLE 4

4,6-diamino - 1,2 - dihydro - 2,2 - dimethyl-1-(3-chloro-4-methylbenzyloxy) - 1,3,5 - triazine hydrochloride M.P. 212–215° C. was made by a process similar to that described in Example 3.

EXAMPLE 5

4,6-diamino - 1,2 - dihydro - 2,2 - dimethyl-1-(3-nitro-4-methylbenzyloxy) - 1,3,5 - triazine hydrochloride M.P. 214–215° C. was made by a process similar to that described in Example 3.

What I claim is:

1. A pharmaceutical formulation for use in the treatment or prevention of malaria comprising an antimalarially effective amount of as active ingredient a compound of the formula

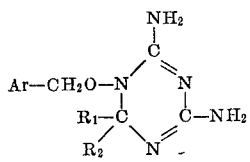

or a pharmaceutically acceptable acid addition salt thereof wherein Ar is 3-nitrophenyl or 2-, 3- or 4-nitrophenyl substituted by at least one member selected from the group consisting of halogen and lower alkyl group of 1–6 carbon atoms, $R_1$ is lower alkyl of 1–4 carbon atoms and $R_2$ is hydrogen or lower alkyl of 1–4 carbon atoms, and a pharmaceutically acceptable carrier.

2. A pharmaceutical formulation as claimed in claim 1 in which Ar is 3-nitrophenyl.
3. A pharmaceutical formulation as claimed in claim 1 in which $R_1$ and $R_2$ are both methyl.
4. A pharmaceutical formulation as claimed in claim 7 containing between 5 mg. and 5 g. of the active ingredient per unit dosage.
5. A formulation as claimed in claim 4 containing between 5 mg. and 600 mg. of the active ingredient per unit dosage.
6. A pharmaceutical formulation as claimed in claim 1 in a form suitable for oral administration.
7. A method for the treatment of malaria which comprises the administration to a person in need of said treatment, of an antimalarially effective amount of a compound of the formula

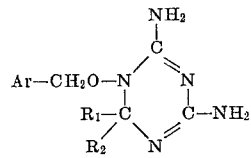

or a pharmaceutically acceptable acid addition salt thereof wherein Ar is 2-, 3- or 4-nitrophenyl or 2-, 3- or 4-nitrophenyl substituted by at least one member selected from the group consisting of halogen and lower alkyl group of 1–6 carbon atoms, $R_1$ is lower alkyl of 1–4 carbon atoms and $R_2$ is hydrogen or lower alkyl of 1–4 carbon atoms, and a pharmaceutically acceptable carrier.

8. The method as claimed in claim 7 wherein the active ingredient is 4,6-diamino-1,2-dihydro-2,2-dimethyl-1-(4-nitrobenzyloxy-1,3,5-triazine or a pharmaceutically acceptable acid addition salt thereof.
9. The method as claimed in claim 7 wherein the active ingredient is 4,6-diamino-1,2-dihydro-2,2-dimethyl-1-(2-nitrobenzyloxy-1,3,5-triazine or a pharmaceutically acceptable acid addition salt thereof.
10. The method as claimed in claim 7 wherein the active ingredient is 4,6-diamino-1,2-dihydro-2,2-dimethyl-1-(3-nitrobenzyl-1,3,5-triazine or a pharmaceutically acceptable acid addition salt thereof.

References Cited

UNITED STATES PATENTS

| | | | |
|---|---|---|---|
| 2,976,288 | 3/1961 | Green et al. | 260—249.9 |
| 3,074,947 | 1/1963 | Elslager et al. | 260—249.9 |
| 3,105,074 | 9/1963 | Mamalis | 260—249.9 |
| 3,170,925 | 2/1965 | Doub | 260—249.9 |
| 3,270,018 | 8/1966 | Urspruwg | 260—249.9 |
| 3,272,814 | 9/1966 | Cutler et al. | 260—249.9 |

JEROME D. GOLDBERG, Primary Examiner